(12) United States Patent
Pareek et al.

(10) Patent No.: US 10,601,915 B2
(45) Date of Patent: Mar. 24, 2020

(54) DATA STREAM PROCESSOR WITH BOTH IN MEMORY AND PERSISTED MESSAGING

(71) Applicant: Striim, Inc., Palo Alto, CA (US)

(72) Inventors: Alok Pareek, Hillsborough, CA (US); Vijayakrishna Nadimpalli, Santa Clara, CA (US); Bhushan Khaladkar, Palo Alto, CA (US); Manish Agarwal, Redmond, WA (US); Nicholas Keene, Madison, WI (US)

(73) Assignee: Striim, Inc., Palo Alto, CA (US)

( * ) Notice: Subject to any disclaimer, the term of this patent is extended or adjusted under 35 U.S.C. 154(b) by 86 days.

(21) Appl. No.: 15/385,833

(22) Filed: Dec. 20, 2016

(65) Prior Publication Data

US 2018/0176122 A1  Jun. 21, 2018

(51) Int. Cl.
*H04L 29/08* (2006.01)
*G06F 11/34* (2006.01)
*G06F 11/30* (2006.01)
*G06F 11/14* (2006.01)

(52) U.S. Cl.
CPC .......... *H04L 67/1097* (2013.01); *G06F 11/30* (2013.01); *G06F 11/3072* (2013.01); *G06F 11/3476* (2013.01); *H04L 67/26* (2013.01); *G06F 11/1441* (2013.01)

(58) Field of Classification Search
CPC .............................. H04L 45/22; H04L 67/1097
USPC .......................................................... 709/239
See application file for complete search history.

(56) References Cited

U.S. PATENT DOCUMENTS

| | | |
|---|---|---|
| 6,321,239 B1 | 11/2001 | Shackelford |
| 7,321,939 B1 | 1/2008 | Porter |
| 7,844,999 B1 | 11/2010 | Aguilar-Macias et al. |
| 8,165,146 B1 * | 4/2012 | Melick ................ H04B 1/7163 370/390 |
| 8,341,131 B2 | 12/2012 | Cohen |
| 8,943,059 B2 | 1/2015 | Rozenwald et al. |
| 2005/0256825 A1 | 11/2005 | Dettinger et al. |
| 2005/0273593 A1 | 12/2005 | Seminaro et al. |
| 2006/0136391 A1 | 6/2006 | Morris |
| 2006/0218116 A1 | 9/2006 | O'Hearn et al. |
| 2006/0287890 A1 | 12/2006 | Stead et al. |
| 2007/0299885 A1 | 12/2007 | Pareek et al. |
| 2009/0030943 A1 | 1/2009 | Kall |
| 2011/0283045 A1 | 11/2011 | Krishnan et al. |

(Continued)

FOREIGN PATENT DOCUMENTS

EP  1308855 A2  5/2003

OTHER PUBLICATIONS

"USMC Field Messages", Jan. 27, 2010, forums.g503.com (3 pages).*

(Continued)

*Primary Examiner* — Benjamin M Thieu
*Assistant Examiner* — Leon Y Tseng
(74) *Attorney, Agent, or Firm* — Cooley LLP

(57) ABSTRACT

A machine has a processor and a memory connected to the processor. The memory stores instructions executed by the processor to receive data from a data source that continuously generates records, selectively identify conditions within the data that satisfy specified rules, and report the conditions prior to routing the data to a message system node forming a segment of a distributed transaction log with messages persisted in non-volatile memory and replicated within a cluster of nodes.

7 Claims, 4 Drawing Sheets

(56) References Cited

U.S. PATENT DOCUMENTS

| | | | |
|---|---|---|---|
| 2011/0307502 A1 | 12/2011 | Boctor | |
| 2012/0072464 A1 | 3/2012 | Cohen | |
| 2013/0006718 A1 | 1/2013 | Nielsen et al. | |
| 2013/0166552 A1 | 6/2013 | Rozenwald et al. | |
| 2016/0292263 A1* | 10/2016 | Ferrar | G06F 11/00 |
| 2017/0063906 A1* | 3/2017 | Muddu | G06F 16/254 |

OTHER PUBLICATIONS

International Search Report dated Mar. 9, 2018, for PCT Application No. PCT/US2017/67668, filed on Dec. 20, 2017, 2 pages.
Written Opinion of the International Searching Authority dated Mar. 9, 2018, for PCT Application No. PCT/US2017/67668, filed on Dec. 20, 2017, 4 pages.
European Search Report issued to European Application No. EP 14800223, dated Jan. 4, 2017, 6 pgs.
International Search Report and Written Opinion issued to PCT Application No. PCT/US14/39240, dated Sep. 24, 2014, 9 pgs.

\* cited by examiner

DATA STREAM PROCESSOR WITH BOTH IN MEMORY AND PERSISTED MESSAGING

FIELD OF THE INVENTION

This invention relates generally to the processing and analysis of data. More particularly, this invention is directed toward a data stream processor that processes and reports events before optionally and automatically persisting data to a message system.

BACKGROUND OF THE INVENTION

As used herein, the term stream processor refers to a computing system that processes a data feed and selectively reports events that satisfy specified conditions. The stream processor is an in-memory processor, meaning it is operative in random memory on data as the data is "in flight". Examples of a data feed include output from a database log, an operating system log, an application log, a web server log, an application server log, a machine generated log, a sensor (e.g., an Internet of Things or IoT device), a social media feed, and the like. The stream processor processes the data feed before the data reaches its ultimate destination, where it may or may not be persisted from memory. The assignee of the current application discloses a stream processor in U.S. Ser. No. 14/285,428, filed May 22, 2014, the contents of which are incorporated herein by reference.

It is desirable to expand the applications and uses of stream processors.

SUMMARY OF THE INVENTION

A machine has a processor and a memory connected to the processor. The memory stores instructions executed by the processor to receive data from a data source that continuously generates or publishes records, selectively identify conditions within the data that satisfy specified rules, and report the conditions prior to routing the data to a message system node forming a segment of a distributed transaction log with messages persisted in non-volatile memory and replicated within a cluster of nodes.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
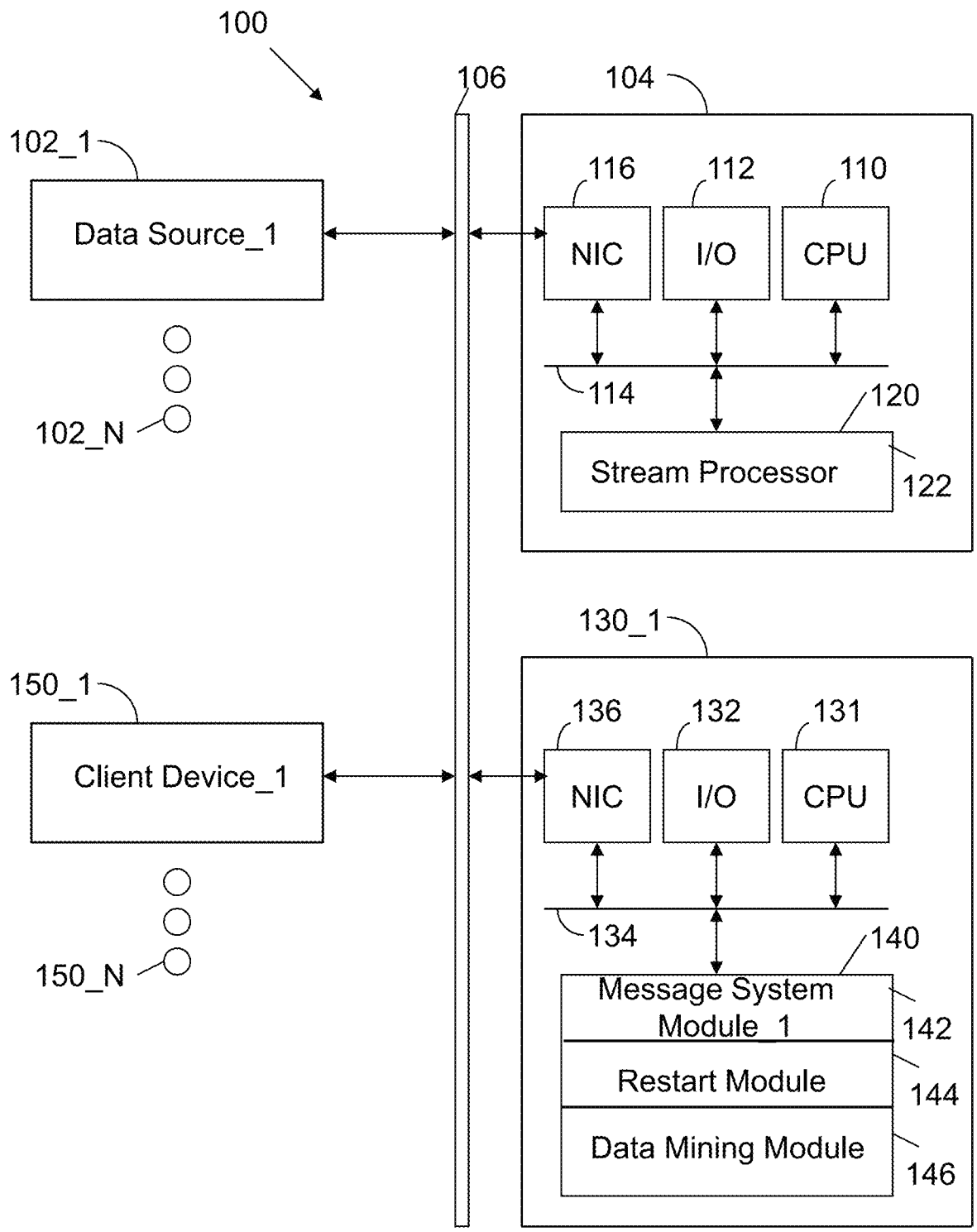
FIG. 1 illustrates a system configured in accordance with an embodiment of the invention.

FIG. 1 illustrates a system 100 configured in accordance with an embodiment of the invention. The system 100 includes a set of data sources 102_1 through 102_N. Each data source continuously generates records (a data feed) that are routed to a server 104 or to servers 130_1 through 130_N via a network 106, which may be any combination of wired and wireless networks. Example data sources include a sensor (e.g., an Internet of Things or IoT device), database log, an operating system log, an application log, a web server log, an application server log, a machine generated log, a social media feed, and the like. Alternately, the data source may be on server 104 or on servers 130_1 through 130_N.

The data is processed at server 104. A single server is referenced for simplicity, but embodiments contemplate the use of distributed servers to implement the operations disclosed herein. The server is operative for "in flight" processing of data before its next destination at one or more servers 130_1 through 130_N.

Server 104 includes standard components, such as a central processing unit 110 connected to a set of input/output devices 112 via bus 114. The input/output devices 112 may include a keyboard, mouse, touch display and the like. A network interface circuit 116 is also connected to the bus 114 to provide connectivity to network 106. A memory 120 is also connected to the bus 114. The memory stores instructions executed by the central processing unit 110 to implement operations disclosed herein. In particular, a stream processor 122 includes instructions to receive data from a data source that is continuously publishing or generating records. The stream processor 122 selectively identifies conditions within the data that satisfy specified rules. The stream processor then reports the conditions, for example to one or more client devices 150_1 through 150_N. The data is then sent to a messaging system implemented on a cluster of servers 130_1 through 130_N. In particular, the data is sent to a message system node (e.g., server 130_1) that forms a segment of a distributed transaction log with messages persisted in non-volatile memory and replicated within a cluster of nodes. By way of example, the message system is Apache® Kafka®. Apache® Kafka® is an open source message broker project developed by the Apache Software Foundation. The message system is a massively scalable publish/subscribe message queue architected as a distributed transaction log to process streaming data.

Server 130_1 also includes standard components, such as a central processing unit 131, input/output devices 132, a bus 134 and a network interface circuit 136 to provide connectivity to network 106. A memory 140 is connected to the bus 134. The memory stores instructions executed by the central processing unit 131 to implement operations disclosed herein. The memory 140 stores a message system module_1 142, which is a node instance of the distributed messaging system. The memory 140 also stores a restart module 144 to coordinate restart operations in the case of a node failure and reboot sequence. The memory also stores a data mining module 146. The data mining module 146 includes executable instructions to coordinate analysis of persistently stored messages within the message system.

FIG. 1 also illustrates client devices 150_1 through 150_N. Each client device may be a computer, tablet, smartphone, and the like. The client devices may receive reports of the conditions identified by the stream processor 122. The client devices may also be used to access and drive the data mining module on server 130_1.

Figure 2:
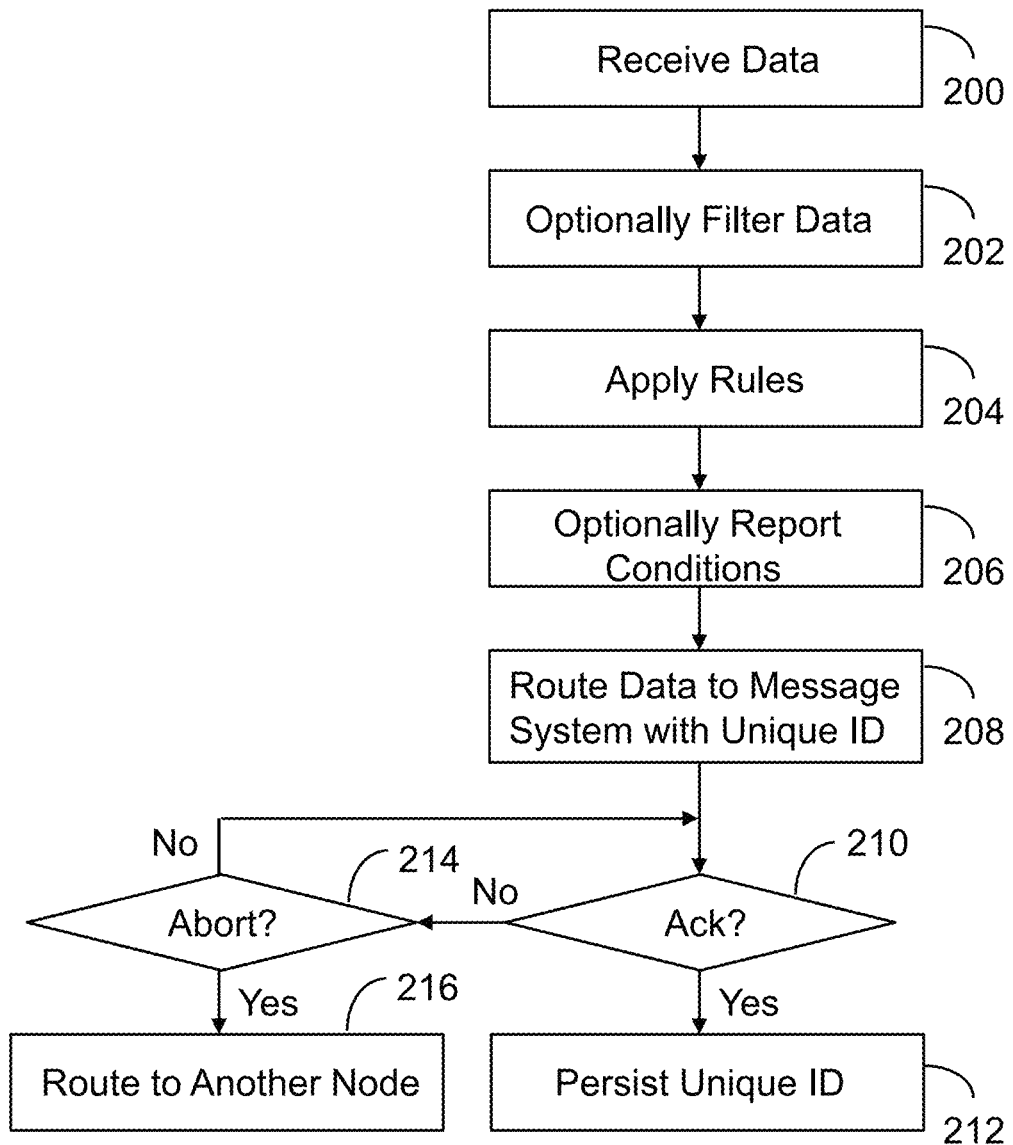
FIG. 2 illustrates stream processor operations performed in accordance with an embodiment of the invention.

FIG. 2 illustrates processing operations associated with an embodiment of the message system. Data is received 200. As previously indicated, the data is from a data source that continuously generates or publishes records.

Next, the data is optionally filtered or transformed 202. For example, the filtering may be in the form of subsampling the data or only processing data above a specified threshold.

Rules are then applied to the data 204. The rules are any pre-specified set of conditions applied to the data. In general, the rules incorporate business logic and are operative to identify data of interest. When conditions of interest are identified, the conditions are reported 206. For example, the conditions are reported in the form of a message to one or more client devices 150_1 through 150_N.

The data is then routed to the message system with a unique ID 208. The routing operation is over network 106 using an application program interface (API) of the message system module 142. In the case of a Kafka implementation, the KafkaProducer API is used.

The raw transaction record, as received by server 104, is forwarded over network 106 to a node (e.g., 130_1) of the message system. The stream processor 122 assigns a unique ID to the data. For example, the unique ID may be based upon a hash of the metadata associated with the record. The unique ID facilitates the removal of duplicate records at the server 104. Existing messaging systems have a difficult time identifying duplicate or redundant data. Utilization of the disclosed stream processor advantageously provides a de-duplication facility for the message system. This guarantees exactly once processing of a message input from systems 102_1 through 102_N.

The stream processor 122 then waits for an acknowledgement or commit signal 210 from the message system. Once the acknowledgement signal is received (210—Yes), the unique ID is persisted 212. The unique ID represents the last acknowledged transaction, which may be referenced in the event of a node failure. The unique ID may be associated with a time stamp (e.g., a universal global time). This allows a message to be identified based upon time.

While waiting for the commit signal (210—No), an abort threshold 214 may be tested. If the abort threshold (e.g., a specified period of time to wait) is not reached (214—No), then control returns to block 210. Otherwise, (214—Yes) the data is routed to another node 216 of the message system. The abort test is effectively testing for a failed node, in which case another node of the distributed message system is utilized.

The previously referenced commonly owned patent application discloses the creation and processing of streams. The current invention provides a mechanism for additionally storing, reading and replaying such streams from a durable messaging system. The stream processor 122 may be configured to process a stream using the following syntax:

CREATE STREAM <name> of <type> PERSIST [USING <property set>]

The <property set> is the name of a set of server properties. In the case of a Kafka® implementation, a default Global.DefaultKafkaProperties attribute is supported. Alternately, a custom property set may be created using the following syntax:

CREATE PROPERTYSET <name> (
    Zk.address: '<zookeeper IP address>:<port>',
    Bootstrap.brokers:'<bootstrap IP address>:<port>', Zookeeper is a reference to Apache® ZooKeeper®, which is also an Apache Software Foundation open source initiative. Zookeeper® provides a distributed configuration service, synchronization service and naming registry for large distributed systems. Zookeeper® supports high availability through redundant services. Kafka® works in conjunction with Zookeeper®. The bootstrap IP address is a reference to the IP address of the server running the distributed messaging system software.

Figure 4:
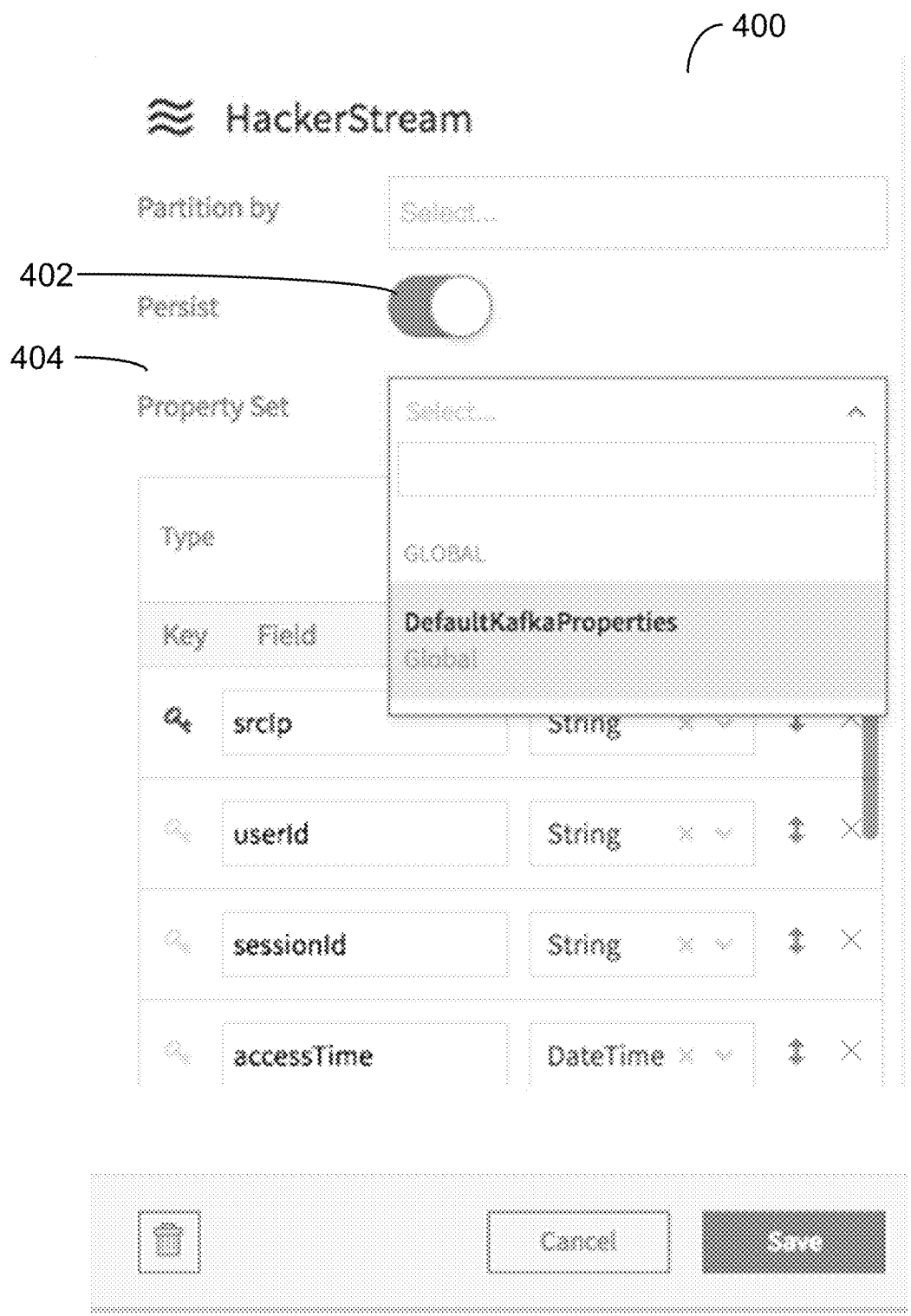
FIG. 4 is a user interface utilized in accordance with an embodiment of the invention.

FIG. 4 illustrates an interface 400 to persist a stream. A persist toggle switch 402 invokes the persist operation. A property set 404 is defined as DefaultKafkaProperties or a created property set, as in the case of the command line embodiment.

Figure 3:
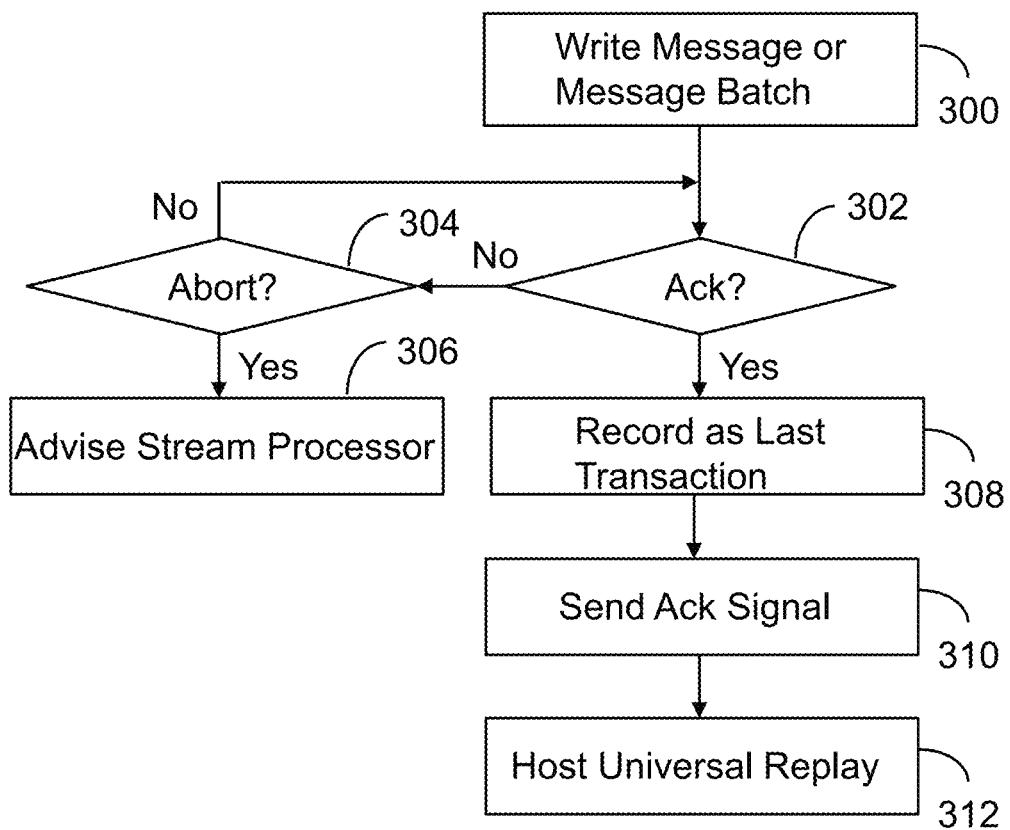
FIG. 3 illustrates message system processing performed in accordance with an embodiment of the invention.

FIG. 3 illustrates processing operations performed by the message system. In one embodiment, the message system is Apache® Kafka® with all its attendant functionality. Initially, a queued message or batch of messages is written to persistent storage 300. The message system module 142 then waits for an acknowledgement signal 302. During the wait period an abort condition 304 is tested. If the acknowledgement signal is not obtained within a threshold period of time (304—Yes), the stream processor is advised 306. The stream processor may then invoke another node.

If a commit signal is received (302—Yes), the commit signal is recorded as the last transaction. The record may include the unique ID and a commit time stamp, which are used in the case of a reboot of the system. A commit signal is then sent 310 to the stream processor.

The messaging system then hosts universal replay 312. That is, the next subscriber in the stream processing pipeline can now read the message from the durable queue without risk of losing the data and without relying on the original external data source to replay the data in the case of a crash. In the event that a node fails, upon reboot, the restart module 144 is operative. The restart module identifies the partition in the cluster with the replica data and ports the replica data onto the node. Note that the messaging system facilitates exactly once processing of data from a non-replayable external data source, such as data being received from an IoT device.

The data mining module 146 includes analytical tools to evaluate messages within the message system. In a Kafka® implementation, the Kafka® Consumer API is used. In one embodiment, the data mining module 146 includes a KafkaReader with the following properties:

| Property | Type | Default Value | Notes |
| --- | --- | --- | --- |
| Topic | Java.lang.String | | |
| brokerAddress | Java.lang.String | | |
| PartitionIDList | Java.lang.String | | Partition numbers to read from, separated by semicolongs, or leave blank to read from all partitions |
| Blocksize | Java.lang.integer | 10240 | Size of the fetch buffer in KB; set this to be greater than or equal to the Kafka broker's message.max.bytes size |

-continued

| Property | Type | Default Value | Notes |
| --- | --- | --- | --- |
| KafkaConfig | Java.lang.String | | Optionally specify Kafka producer properties, separated by semicolons |
| Charset | Java.lang.String | UTF-8 | |
| startOffset | Java.lang.Long | −1 | With default value of −1, reads from the end of the partition. Change to 0 to read from the beginning of the partition |

Observe that the data mining module 146 is decoupled from the stream processor 122. Thus, the data mining module 146 can operate on local data. Moreover, computational resources of the stream processor 122 need not be used for playback or analysis of data.

The data mining module 146 may identify a message based upon the unique ID or a time stamp.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A machine, comprising:
an in-memory data stream processor with random access memory storing instructions executed by the in-memory data stream processor to:
receive data in the random access memory from a data source that continuously publishes records to a network to form a continuous data feed, wherein the data source is one of a sensor, a database log, an operating system log, an application log, a web server log, an application server log, a machine generated log and a social media feed,
apply business logic rules to the continuous data feed in random access memory to identify data of interest,
report the data of interest to one or more client devices via the network prior to routing the continuous data feed via the network to a message system node forming a segment of a distributed transaction log with messages persisted in non-volatile memory and replicated via the network within a cluster of nodes as a persisted message stream corresponding to the continuous data feed, wherein the cluster of nodes has properties including a distributed configuration service, synchronization service and naming registry; and
replay data from the persisted message stream corresponding to the continuous data feed.

2. The machine of claim 1 wherein the instructions to apply business logic rules include data filtering and transformation instructions.

3. The machine of claim 1 further comprising instructions executed by the processor to route the data to the message system with a unique identification.

4. The machine of claim 3 further comprising instructions executed by the processor to route the data to the message system with the unique identification and corresponding time stamp.

5. The machine of claim 3 further comprising instructions executed by the processor to store the unique identification in persistent memory in response to an acknowledge signal from the message system.

6. The machine of claim 1 further comprising instructions executed by the processor to route the data to another node within the cluster of nodes in response to an absent acknowledgement signal from the message system.

7. The machine of claim 1 further comprising instructions executed by the processor to utilize a unique message identification to remove duplicate records.

* * * * *